(12) United States Patent
Walsh et al.

(10) Patent No.: US 8,244,855 B1
(45) Date of Patent: Aug. 14, 2012

(54) APPLICATION STATE AWARE MEDIATING SERVER

(75) Inventors: Richard J. Walsh, Raleigh, NC (US); James Evans, Apex, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1170 days.

(21) Appl. No.: 11/471,751

(22) Filed: Jun. 21, 2006

(51) Int. Cl.
*G06F 15/173* (2006.01)

(52) U.S. Cl. ...................................... 709/224

(58) Field of Classification Search .................. 709/224, 709/223
See application file for complete search history.

(56) References Cited

U.S. PATENT DOCUMENTS

| | | | |
|---|---|---|---|
| 6,076,108 A * | 6/2000 | Courts et al. .................. | 709/227 |
| 6,385,641 B1 * | 5/2002 | Jiang et al. .................... | 709/203 |
| 6,721,282 B2 | 4/2004 | Motley | |
| 6,789,116 B1 * | 9/2004 | Sarkissian et al. ............ | 709/224 |
| 6,839,751 B1 * | 1/2005 | Dietz et al. .................... | 709/224 |
| 6,987,985 B2 | 1/2006 | Purkayastha et al. | |
| 7,002,955 B1 * | 2/2006 | Kanuri et al. ................. | 370/389 |
| 7,016,668 B2 | 3/2006 | Vaidyanathan et al. | |
| 7,203,744 B1 * | 4/2007 | Parekh et al. ................. | 709/223 |
| 7,263,545 B2 * | 8/2007 | Digate et al. .................. | 709/206 |
| 7,607,170 B2 * | 10/2009 | Chesla ............................ | 726/22 |
| 7,624,436 B2 * | 11/2009 | Balakrishnan et al. ......... | 726/13 |
| 7,769,851 B1 * | 8/2010 | Guruswamy et al. ......... | 709/224 |
| 2002/0010759 A1 | 1/2002 | Hitson et al. | |
| 2002/0013812 A1 | 1/2002 | Krueger et al. | |
| 2002/0054578 A1 | 5/2002 | Zhang et al. | |
| 2002/0061029 A1 | 5/2002 | Dillon | |
| 2002/0104099 A1 | 8/2002 | Novak | |
| 2002/0129367 A1 | 9/2002 | Devara | |
| 2002/0144267 A1 | 10/2002 | Gutta et al. | |
| 2002/0156842 A1 | 10/2002 | Signes et al. | |
| 2003/0050055 A1 | 3/2003 | Ting et al. | |
| 2003/0081580 A1 | 5/2003 | Vaidyanathan et al. | |
| 2003/0152096 A1 | 8/2003 | Chapman | |
| 2003/0161268 A1 | 8/2003 | Larsson et al. | |
| 2003/0217099 A1 * | 11/2003 | Bobde et al. .................. | 709/202 |
| 2004/0030798 A1 | 2/2004 | Anderson et al. | |

(Continued)

FOREIGN PATENT DOCUMENTS

GB 2 306 869 A 11/1995

OTHER PUBLICATIONS

Eric Setton et al., "Cross-Layer Design of Ad Hoc Networks for Real-Time Video Streaming," (article), Aug. 2005, pp. 99-102, vol. 12, issue 4, IEEE Wireless Communications.

(Continued)

*Primary Examiner* — Jeffrey Nickerson
(74) *Attorney, Agent, or Firm* — Withrow & Terranova, PLLC

(57) ABSTRACT

An application state aware mediating server or proxy. In general, the mediating server includes a packet inspection engine, a state inspector, and optionally a state classifier. The packet inspection engine examines packets passing through the mediating server to identify packets satisfying packet identification criteria of the state inspector. The identified packets are provided to the state inspector. Based on one or more of the identified packets, the state inspector determines an application state, or partial application state, for the application. Optionally, the state classifier may map the application state into one of a number of predefined state classifications.

22 Claims, 4 Drawing Sheets

U.S. PATENT DOCUMENTS

| | | | |
|---|---|---|---|
| 2004/0042421 A1 | 3/2004 | Mahany | |
| 2004/0117824 A1 | 6/2004 | Karaoguz et al. | |
| 2004/0199630 A1* | 10/2004 | Sarkissian et al. | 709/224 |
| 2004/0248615 A1 | 12/2004 | Purkayastha et al. | |
| 2004/0254998 A1* | 12/2004 | Horvitz | 709/206 |
| 2004/0264372 A1 | 12/2004 | Huang | |
| 2005/0008017 A1 | 1/2005 | Datta et al. | |
| 2005/0010664 A1* | 1/2005 | Hubbard | 709/224 |
| 2005/0034001 A1 | 2/2005 | Pontarelli | |
| 2005/0044422 A1* | 2/2005 | Cantrell et al. | 713/201 |
| 2005/0108769 A1 | 5/2005 | Arnold et al. | |
| 2005/0120127 A1 | 6/2005 | Bradley et al. | |
| 2005/0169632 A1 | 8/2005 | Song et al. | |
| 2005/0183120 A1 | 8/2005 | Jain et al. | |
| 2005/0192987 A1 | 9/2005 | Marsh | |
| 2005/0201340 A1 | 9/2005 | Wang et al. | |
| 2005/0216942 A1 | 9/2005 | Barton | |
| 2005/0229246 A1* | 10/2005 | Rajagopal et al. | 726/14 |
| 2005/0238012 A1* | 10/2005 | Panigrahy et al. | 370/389 |
| 2005/0239497 A1 | 10/2005 | Bahl et al. | |
| 2005/0281194 A1* | 12/2005 | Sonoda | 370/220 |
| 2005/0286438 A1 | 12/2005 | Rajkotia | |
| 2006/0037077 A1* | 2/2006 | Gadde et al. | 726/23 |
| 2006/0048185 A1 | 3/2006 | Alterman | |
| 2006/0048186 A1 | 3/2006 | Alterman | |
| 2006/0053452 A1 | 3/2006 | Lee et al. | |
| 2006/0056349 A1 | 3/2006 | Nakatugawa et al. | |
| 2006/0085830 A1 | 4/2006 | Bruck et al. | |
| 2006/0114832 A1* | 6/2006 | Hamilton et al. | 370/244 |
| 2006/0129672 A1 | 6/2006 | Mayer | |
| 2006/0129810 A1* | 6/2006 | Jeong et al. | 713/166 |
| 2006/0206933 A1 | 9/2006 | Molen et al. | |
| 2006/0233101 A1* | 10/2006 | Luft et al. | 370/229 |
| 2007/0002742 A1 | 1/2007 | Krishnaswamy et al. | |
| 2007/0058561 A1* | 3/2007 | Virgile | 370/252 |
| 2007/0061488 A1 | 3/2007 | Alagappan et al. | |
| 2007/0061580 A1 | 3/2007 | Venkatesan et al. | |
| 2007/0223437 A1* | 9/2007 | Virgile | 370/338 |
| 2010/0174770 A1* | 7/2010 | Pandya | 709/200 |

OTHER PUBLICATIONS

No Author, "PC Connection," (website), 2006, 2 pages, http://www.pcconnection.com/ProductDetail?sku=5373172&SourceID=k40132.

Vijay T. Raisinghani et al., "ECLAIR: An Efficient Cross Layer Architecture for Wireless Protocol Stacks," (article), May 25-28, 2004, 6 pages, 5th World Wireless Congress, San Francisco, CA.

Vineet Srivastava et al., "Cross-Layer Design: A Survey and the Road Ahead," (article), Dec. 2005, pp. 112-119, IEEE Communications Magazine.

No Author, "Cisco AON: A Network-Based Intelligent Message Routing System," (article), Mar. 31, 2006, 7 pages, http://www.cisco.com/en/US/products/ps6438/products_data_sheet0900aecd802c1f9c.html.

* cited by examiner

APPLICATION STATE AWARE MEDIATING SERVER

FIELD OF THE INVENTION

The present invention relates to a mediating server, or proxy, and more particularly relates to a mediating server for ascertaining application state.

BACKGROUND OF THE INVENTION

Network devices such as firewalls, routers, and proxies filter and inspect network traffic flowing through the device. These devices are primarily focused on security and enhancing the efficiency of network traffic flow. In addition, some network devices transform packets from one protocol to another, perform content-based routing, perform application-based load sharing, and provide a host of other sophisticated features. However, while these network devices are aware of an application layer protocol (HTTP, SMTP, JMS, etc.), they do not understand the actual state of the application. Thus, there is a need for a network device, such as a mediating or proxy server, for ascertaining application state.

SUMMARY OF THE INVENTION

The present invention provides an application state aware mediating server or proxy. In general, the mediating server includes a packet inspection engine, a state inspector, and optionally a state classifier. The state inspector is preferably associated with a particular application and provides packet identification criteria to the packet inspection engine. The packet inspection engine examines packets passing through the mediating server to identify packets satisfying the packet identification criteria of the state inspector. When a packet satisfying the packet identification criteria is identified, the packet inspection engine provides the packet to the state inspector. Based on the packet or a series of packets, the state inspector determines an application state, or partial application state, of the application. Optionally, the state classifier operates to map the application state into one of a number of defined state classifications using, for example, a predefined ontology for the application to gain a semantic understanding of the application state. The state classification, application state, partial application state, or any combination thereof may thereafter be used by the mediating server or a third party service provider to provide an additional service to clients, servers, or both clients and servers associated with the mediating server.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
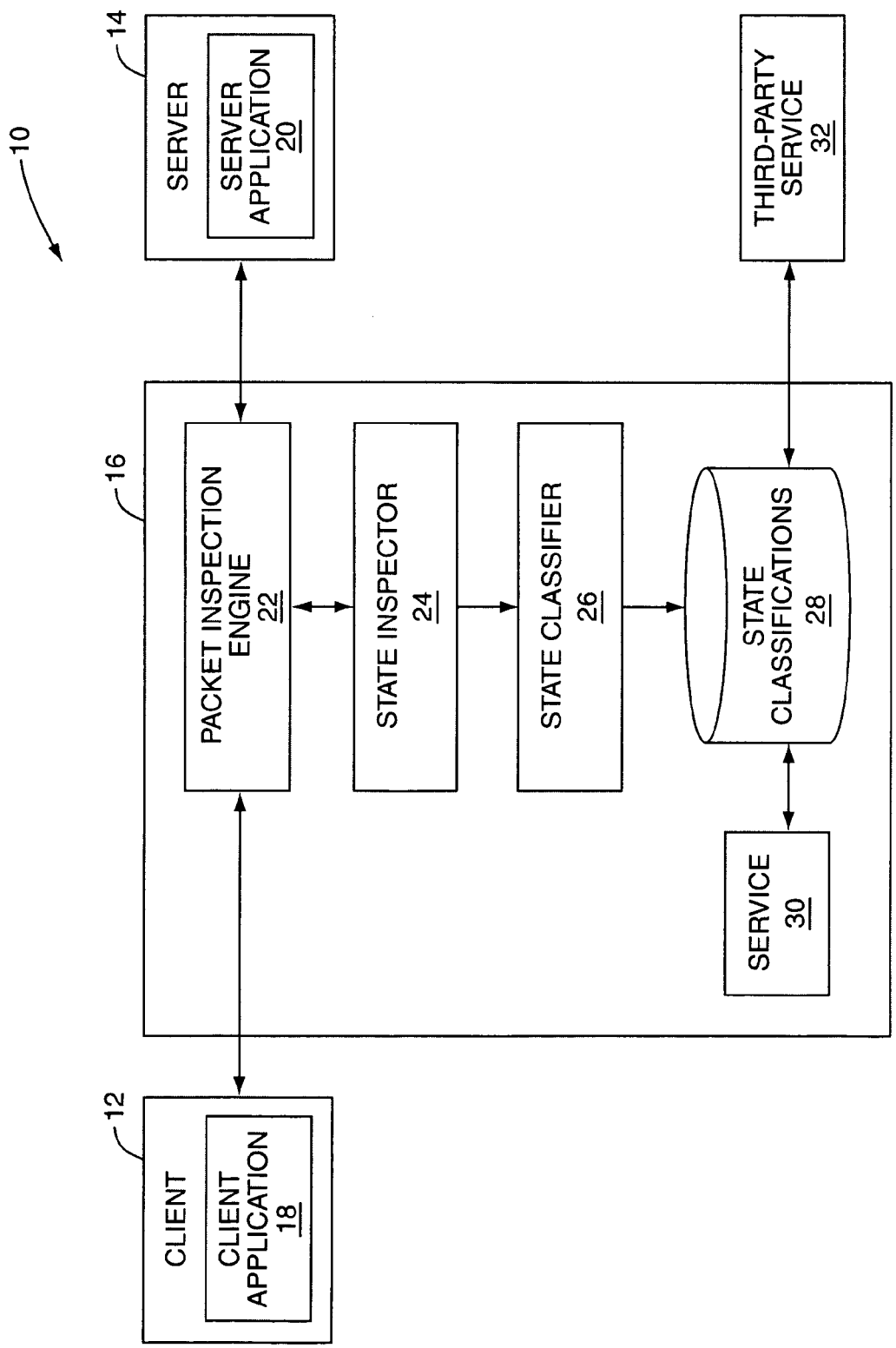
FIG. 1 illustrates a system including an application state aware mediating server according to one embodiment of the present invention.

FIG. 1 illustrates a system 10 including a client 12, a server 14, and an application state aware mediating server 16 interconnecting the client 12 and the server 14 according to one embodiment of the present invention. The client 12 is a network device such as, but not limited to, a personal computer, a mobile telephone, a Personal Digital Assistant (PDA), a Personal Video Recorder (PVR), or the like having a client application 18 installed thereon. The client application 18 may be, for example, an Instant Messaging (IM) application providing text or voice chat capabilities, a Massive Multiplayer Online Game (MMPOG) application, a PVR application, an e-commerce application such as Apple's iTunes, or the like. The server 14 may be a single server or a number of distributed servers and has a server application 20 installed thereon. For example, the server application 20 may be a server side application for an IM system, a MMPOG, a PVR system, an e-commerce system, web browser, or the like.

The mediating server 16 is part of a network interconnecting the client 12 and the server 14. While not illustrated for clarity, one or more network nodes may interconnect the mediating server 16 to both the client 12 and the server 14. However, the mediating server 16 may be located at any point in the network between the client 12 and the server 14, and may even be incorporated into the client 12 or server 14, if desired. Further, while only one client 12 and one server 14 are illustrated, the mediating server 16 may interconnect numerous clients 12 and servers 14. Still further, the mediating server 16 may be a single server or a number of distributed servers operating in a collective manner to share application state information, state classifications, or a combination thereof.

The mediating server 16 includes a packet inspection engine 22 and a state inspector 24. In addition, the mediating server 16 may optionally include a state classifier 26 and a state classifications database 28. The mediating server 16 may also host a service 30 that provides an additional service to the client 12 or the server 14 using the state classifications database 28. Alternatively, a third-party service 32 may provide an additional service to the client 12 or the server 14 using the state classifications database 28 or information ascertained by the state inspector 24.

The packet inspection engine 22 may be implemented in hardware, software, or a combination of hardware and software. In operation, the packet inspection engine 22 operates to inspect packets passing through the mediating server 16 in order to identify packets of interest to the state inspector 24. Note that the packets passing through the mediating server 16 include the packets transferred to and from the client 12 and the server 14 as well as packets to and from numerous additional clients and servers. In operation, the state inspector 24 provides packet identification criteria to the packet inspection engine 22. The packet identification criteria may vary depending on the particular implementation. As an example, the packet identification criteria may include one or more source Internet Protocol (IP) addresses of interest to the state inspector 24, one or more destination IP addresses of interest to the state inspector 24, one or more ports of interest to the state inspector 24, one or more Media Access Control (MAC) addresses of interest to the state inspector 24, protocol, or the like. As packets pass through the mediating server 16, the packet inspection engine 22 examines the packets to determine whether the packets satisfy the packet identification criteria of the state inspector 24. Packets that satisfy the packet identification criteria are identified as packets of interest to the state inspector 24 and are therefore provided to the state inspector 24.

The state inspector 24 is preferably associated with a particular type of application such as, for example, Yahoo! Messenger. The state inspector 24 may be implemented in hardware, software, or a combination of hardware and software. In one embodiment, the state inspector 24 operates to extract application state data from the packets of interest identified by the packet inspection engine 22. In general, application state represents the internal (variables) and external (databases) data, application resources (memory, files, sockets, etc), user sessions, meta information, and the like, which collectively describe the current situation or "state" of the application. However, application state varies with each particular application. The application state, or partial application state, may be ascertained from the application state data in a single packet or from the application state data from a series of packets over time. In another embodiment, the packets received by the state inspector 24 may include an application state identifier (ID), and the state inspector 24 may request the application state from an external source such as, but not limited to, the server 14 based on the application state ID. The state inspector 24 may additionally or alternatively request the application state from the client application 18.

It should be noted that while only one state inspector 24 is illustrated, the mediating server 16 may include any number of state inspectors 24. Further, the state inspector 24 is preferably a plug-in application such that state inspectors 24 may be added or removed from the mediating server 16 as desired.

The application state is then provided to the state classifier 26. The state classifier 26 may be implemented in hardware, software, or a combination of hardware and software and operates to map the application state into one of a number of predefined state classifications to gain semantic understanding of the application state. As will be apparent to one of ordinary skill in the art upon reading this disclosure, each application has a different concept of state. As such, the state classifications vary depending on the particular application. In one embodiment, the state classifier 26 maps the application state into one of a number of state classifications. Once determined by the state classifier 26, the state classification is stored in the state classifications database 28. Note that the application state may also be stored by the mediating server 16.

Optionally, the mediating server 16 may host the service 30. The service 30 is preferably implemented in software, but may alternatively be implemented in hardware or a combination of hardware and software. The service 30 generally provides an additional service to the client 12, the server 14, or both the client 12 and the server 14 using the state classifications stored in the state classifications database 28 and/or the application states. As an alternative or in addition to the service 30, the third-party service 32 is hosted by an associated server and may provide an additional service to the client 12, the server 14, or both the client 12 and the server 14 using the state classifications stored in the state classifications database 28. Examples of the types of additional services that may be provided by the service 30 and the third-party service 32 are discussed below in detail.

Figure 2:
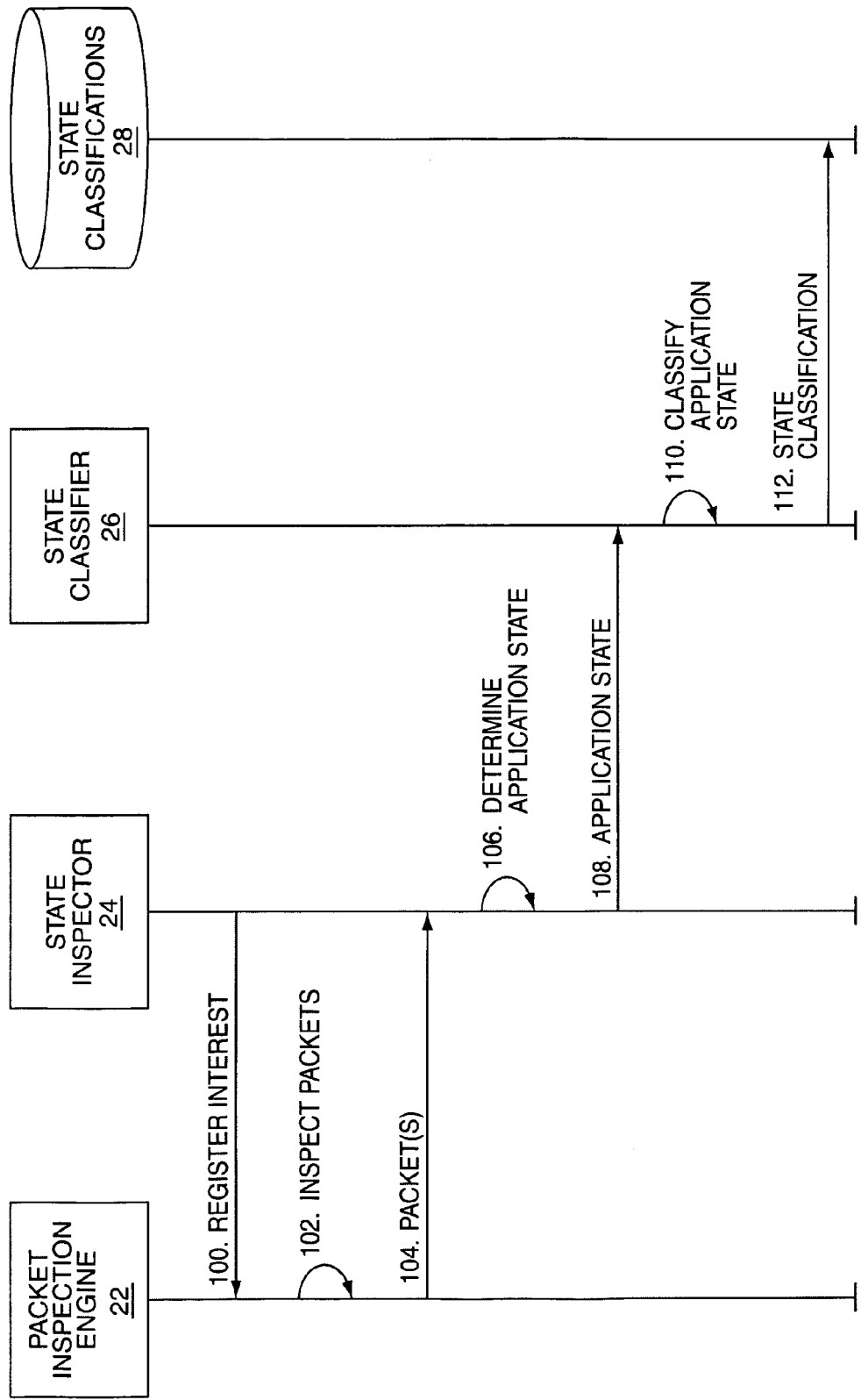
FIG. 2 illustrates the operation of the application state aware mediating server according to one embodiment of the present invention.

FIG. 2 illustrates the operation of the mediating server 16 according to one embodiment of the present invention. First, the state inspector 24 registers an interest with the packet inspection engine 22 (step 100). The state inspector 24 registers an interest by providing packet identification criteria to the packet inspection engine 22. As discussed above, the packet identification criteria may include, for example, one or more source or destination IP addresses, one or more ports, one or more source or destination MAC addresses, or the like. If there are multiple state inspectors 24, then each of the state inspectors 24 registers an interest with the packet inspection engine 22. The packet inspection engine 22 then inspects packets passing through the mediating server 16 to identify packets satisfying the packet identification criteria of the state inspector 24, thereby identifying packets of interest to the state inspector 24 (step 102). Once identified, the packets of interest are provided to the state inspector 24 (step 104).

The state inspector 24 then determines an application state, or partial application state, of the client application 18, the server application 20, or an overall application implemented by the client and server applications 18 and 20 (step 106). The application state may be ascertained from a single packet or from a series of packets over time. Once the application state is determined, the application state is provided to the state classifier 26 (step 108). The application state may be provided to the state classifier 26 after the application state is ascertained. Alternatively, the partial application state may be provided to the state classifier 26 as the application state is being ascertained such that the state classifier 26 is not required to wait until the complete application state is determined.

The state classifier 26 then classifies the application state (step 110) and stores the state classification in the state classifications database 28 (step 112). In one embodiment, the state classifier 26 may classify the application state by mapping the application state to a node in a predefined ontology for the application. In another embodiment, the state classifier 26 may classify the application state based on a list relating application states to state classifications. For example, the client application 18 may be an Instant Messaging application such as Yahoo! Messenger, and the application state of the client application 18 may be or include the user's status, which may be "Available," "Busy," "Stepped Out," "Be Right Back," "Not at My Desk," "On the Phone," "In Meeting," or the like. This information may be provided in the packets provided from the client 12 to the server 14. The service 30 or the third-party service 32 may only be interested in knowing whether the user is available or not available. As such, the state classifier 26 may have two state classifications, "Available" and "Not Available," and may operate to map the application states "Busy," "Stepped Out," "Be Right Back," "Not at My Desk," "On the Phone," and "In Meeting" to the state classification of "Not Available" and map the application state "Available" to the state classification "Available." As another example, the client application 18 may be a MMPOG application such as Blizzard's online fantasy game "World of Warcraft" (WoW). The application state of WoW may be classified on an ontology, where the nodes on the ontology may represent game concepts such as quests, locations, achievements, and the like. The application state, or partial application state, of the WoW game, may be mapped to a node on the ontology, thereby providing the state classification.

Figure 3:
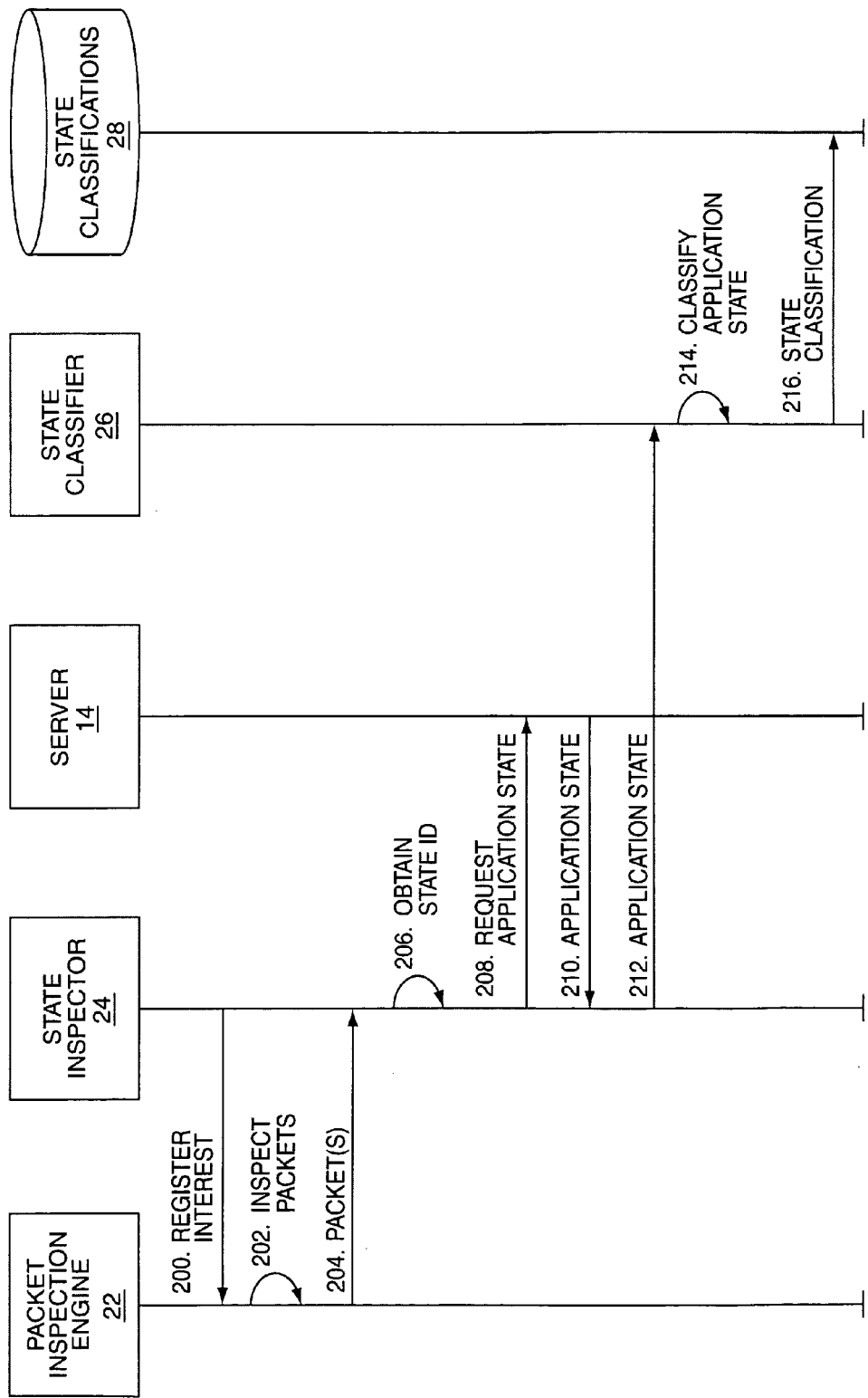
FIG. 3 illustrates the operation of the application state aware mediating server according to a second embodiment of the present invention.

FIG. 3 illustrates the operation of the mediating server 16 according to a second embodiment of the present invention. In this embodiment, the packets identified by the packet inspection engine 22 contain an identifier or code corresponding to the application state of the client application 18, the server application 20, or the overall application implemented by the client and server applications 18 and 20. More specifically, the state inspector 24 registers an interest with the packet inspection engine 22 (step 200). The state inspector 24 registers an interest by providing packet identification criteria to the packet inspection engine 22. As discussed above, the packet identification criteria may include, for example, one or more source or destination IP addresses, one or more ports, one or more source or destination MAC addresses, or the like. If there are multiple state inspectors 24, then each of the state inspectors 24 registers an interest with the packet inspection engine 22. The packet inspection engine 22 then inspects packets passing through the mediating server 16 to identify packets satisfying the packet identification criteria of the state inspector 24, thereby identifying packets of interest to the state inspector 24 (step 202). Once identified, the packets of interest are provided to the state inspector 24 (step 204).

The state inspector 24 then obtains or extracts an application state identifier (ID) from the packet or packets identified by the packet inspection engine 22 (step 206). In this example, the state inspector 24 then sends the application state ID to the server 14 in a request for the application state (step 208). However, the state inspector 24 may alternatively send the request to a third-party server, such as a server maintained by a provider or manufacturer of the client and/or server applications 18 and 20. Alternatively, the state inspector 24 may use the application state ID to query the client application 18, the server 14, the third-party server, or any combination thereof to determine the application state. Based on the application state ID, the server 14 identifies the application state and provides the application state to the state inspector 24 (step 210). The state inspector 24 then provides the application state to the state classifier 26 (step 212). The state classifier 26 then classifies the application state (step 214) and stores the state classification in the state classifications database 28 (step 216), as described above.

Returning to FIG. 1, by being aware of the application state and by mapping the application state to a state classification, the mediating server 16 enables additional services to be provided. These services may be services provided by the mediating server 16, such as the service 30, or third-party services, such as the third-party service 32, hosted by third-party servers. In one embodiment, the mediating server 16 may be queried by the service 30, the third-party service 32, the client 12, or the server 14 to identify clients 12 or servers 14 having a desired state classification or an application state satisfying specified criteria.

As a first example, the service 30, 32, or alternatively a client or server such as the client 12 or server 14, may query the mediating server 16 to identify clients for a voice or text chat session. More specifically, the client application 18 on a number of clients 12 associated with the mediating server 16 may be an instant messaging application having both text and voice chat capabilities. The mediating server 16, and more specifically the state classifications database 28, may be queried to identify the clients 12 whose client applications 18 have a desired state classification, such as "Available." Alternatively, the mediating server 16 may be queried based on application state. Once identified, a voice or text chat session may be initiated between the identified clients 12.

Further, the mediating server 16 may be enabled to determine the capabilities of the clients 12 based on device profiles observed by the mediating server 16. The device profiles may be Composite Capability/Preference Profiles (CC/PPs) enabling customization of web content provided to the clients 12 based on the capabilities and user preferences of the clients 12. By providing the device profiles, or portions thereof, to the mediating server 16, the mediating server 16 may be queried not only based on state classification or application state, but also based on the capabilities of the clients 12. For example, the mediating server 16 may be queried by the service 30, 32 or the client 12 to identify clients 12 having a specified application state and capabilities. More specifically, the mediating server 16 may be queried to identify the clients 12 having an instant messaging application that are "Available" and have a microphone and speakers in order to identify clients 12 for a voice chat session.

As a second example, the client 12 may be a PVR system. Consider the PVR system as a whole to be an application performing functions such as content recording, content playback, channel navigation, program scheduling, and the like. As the client 12 communicates with the server 14 to store, fetch, and search content, the mediating server 16 determines the application state of the client 12. The application state may include a television program currently recording, a television program currently being viewed, and program schedule selection information. As a user is navigating the program schedule, the service 30, 32 may provide information about other users in the system 10 that are currently watching a selected program or considering watching the selected program. Further, if the client 12 enables personal user profiles, the service 30, 32 may also provide demographic information about the users watching a selected program.

With regard to the PVR system, the mediating server 16 may operate to augment the recording function. More specifically, if the user of the client 12 starts watching a television program ten minutes after it began, the service 30, 32 or the client 12 may query the mediating server 16 to identify one or more other clients having an application state or state classification indicating that the client is recording the same television program. The service 30, 32, or alternatively the client 12, may then request the ten minutes of the program from one of the identified clients.

As a third example, MMPOGs such as WoW enable users to form groups or parties to collaboratively achieve certain goals. In order to form a group, the user at the client 12 defines membership criteria, where the membership criteria are provided to the service 30, 32. The service 30, 32 may then be used to query mediating sever 16 to identify clients 12 having an application state or state classification satisfying the membership criteria. Alternatively, the client 12 may directly query the mediating server 16. The service 30, 32 may then alert the user at the client 12 of other clients 12 satisfying the membership criteria such that the user may invite the users of the identified clients 12 to join his or her group.

Although the examples above focus on querying the mediating server 16 based on a single state classification, the present invention is not limited thereto. As an example, the service 30, 32 may be a service that establishes voice chat sessions between users playing WoW. The service 30, 32 may query the state classifications database 28 to identify clients 12 having a common WoW state classification and having speaker and microphone hardware capabilities. The service 30, 32 may then query the state classifications database 28 to determine the state classifications of media players on the identified clients 12. As a result, the service 30, 32 may learn that the users of the clients 12 having the common WoW state classification all like music from the "Rock" music genre and may provide a "Rock" Internet radio station as background music for a voice chat session. The service 30, 32 may then initiate a voice chat session between the users of the identified clients 12 wherein the "Rock" Internet radio station is provided as background music for the voice chat session.

The state classifications, the application states, or a combination thereof may also be used by the mediating server 16 as part of a caching algorithm. For example, the mediating server 16 may be an edge server for the WoW online game and operate to cache scenery data based on the state classifications or application states of its user population.

Similarly, the mediating server 16 may use the state classifications or application states in a pre-fetching algorithm wherein the mediating server 16 pre-fetches data from the server 14 based on anticipating the application state or state classification of the client 12. For example, the mediating server 16 may be an edge server for the WoW game and operate to pre-fetch scenery data based on the application state or state classification of the client 12.

The mediating server 16 may also use the application states and state classifications to gain efficiencies by pooling outbound requests. For example, for an MMPOG application such as the WoW game, the client 12 may provide a current location of the user within the gaming environment to the server 14. In response, the server 14 may provide scenery data for that location to the client 12. Based on the application state or state classification, the mediating server 16 may recognize that two clients 12 are within a common zone of the gaming environment. The mediating server 16 may then pool the requests for the two clients 12 such that scenery data is obtained from the server 14 and multicast to the two clients 12, thereby reducing the bandwidth required for transferring the scenery data.

The above examples of the uses of the application state aware mediating server 16 are exemplary and are not intended to limit the scope of the present invention. One of ordinary skill in the art will recognize numerous other uses of the present invention upon reading this disclosure.

Figure 4:
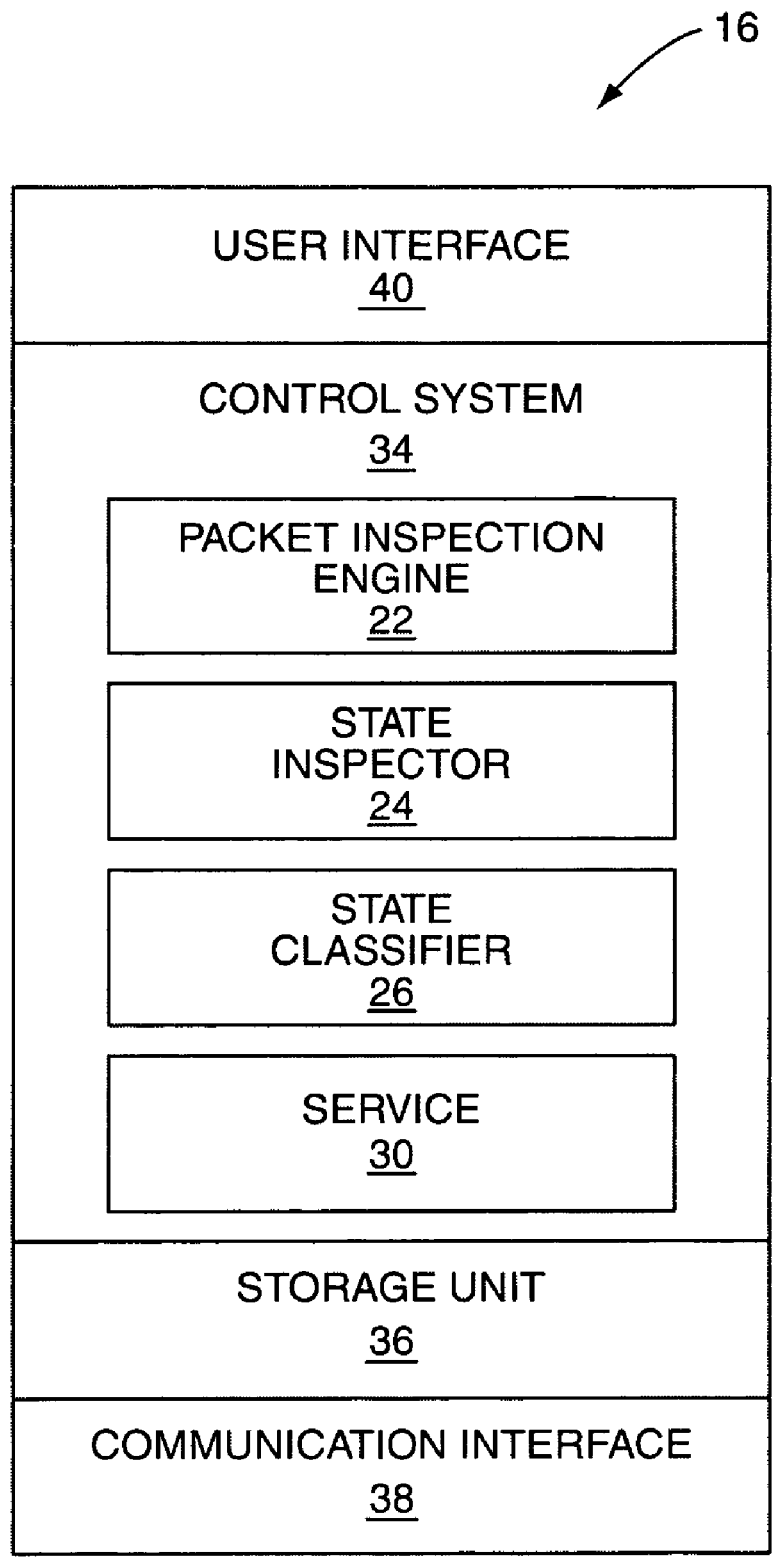
FIG. 4 is a block diagram of the application state aware mediating server according to one embodiment of the present invention.

FIG. 4 is a block diagram of an exemplary embodiment of the mediating server 16. In general, the mediating server 16 includes a control system 34. The control system 34 may generally be any combination of hardware and software. The control system 34 includes the packet inspection engine 22, the state inspector 24, the state classifier 26, and the service 30, each of which may be implemented in hardware, software, or a combination of hardware and software. The mediating server 16 also includes a storage unit 36, which may be memory such as, but not limited to, Random Access Memory (RAM), one or more hard disc drives, or the like. The storage unit 36 operates to store the state classifications database 28 and optionally the application states. The mediating server 16 also includes a communication interface 38 communicatively coupling the mediating sever 16 to the client 12 and the server 14 via a network. The mediating server 16 may also include a user interface 40.

Those skilled in the art will recognize improvements and modifications to the preferred embodiments of the present invention. All such improvements and modifications are considered within the scope of the concepts disclosed herein and the claims that follow.

What is claimed is:

1. A hardware mediating server comprising:
   a) a communication interface;
   b) memory; and
   c) a control system associated with the communication interface and comprising:
      i) a packet inspection engine adapted to:
         inspect packets received by the mediating server to identify packets associated with a desired application based on at least one packet identification criterion;
         forward at least one of the identified packets; and
      ii) a state inspector adapted to:
         receive the at least one of the identified packets;
         determine an application state of the desired application based on the at least one of the identified packets;
         for each of a plurality of clients associated with the mediating server, determine a capability of a client;
         receive a query comprising a desired criterion and a desired application state from a requesting network node for ones of the plurality of clients having capabilities satisfying the desired criterion and having the desired application state;
         identify the ones of the plurality of clients satisfying both the desired criterion and the desired application state; and
         provide information identifying the ones of the plurality of clients to the requesting network node where the requesting network node establishes an initial communication session with one of the plurality of clients using the provided information, and wherein the control system is further adapted to pre-fetch data from an associated server based on anticipating a future application state of the desired application based on the determined application state.

2. The hardware mediating server of claim 1 wherein the state inspector is further adapted to:
   extract information relating to the application state from the at least one of the identified packets; and
   determine the application state based on the extracted information.

3. The hardware mediating server of claim 1 wherein the control system further comprises a state classifier adapted to classify the application state as one of a plurality of predefined state classifications.

4. The hardware mediating server of claim 3 wherein the state classifier is further adapted to classify the application state based on a predefined ontology for the desired application.

5. The hardware mediating server of claim 1 wherein the control system further comprises a plurality of state classifiers each adapted to classify the desired application state as one of a corresponding plurality of predefined state classifications.

6. The hardware mediating server of claim 1 wherein the control system further comprises a plurality of state inspectors including the state inspector each associated with a corresponding one of a plurality of desired applications including the desired application, and the packet inspection engine is further adapted to inspect the packets received by the mediating server to identify packets for each of the plurality of state inspectors based on corresponding packet identification criteria.

7. The hardware mediating server of claim 6 wherein each one of the plurality of state inspectors is adapted to determine an application state of the corresponding one of the plurality of desired applications based on the at least one of the identified packets for the one of the plurality of state inspectors.

8. The hardware mediating server of claim 1 wherein the at least one packet identification criterion comprises a source Internet Protocol (IP) address.

9. The hardware mediating server of claim 1 wherein the at least one packet identification criterion comprises a destination Internet Protocol (IP) address.

10. The hardware mediating server of claim 1 wherein the at least one packet identification criterion comprises a port.

11. The hardware mediating server of claim 1 wherein the at least one packet identification criterion comprises a source Media Access Control (MAC) address.

12. The hardware mediating server of claim 1 wherein the at least one packet identification criterion comprises a destination Media Access Control (MAC) address.

13. The hardware mediating server of claim 1 wherein the control system is further adapted to pool outbound requests based on the application state.

14. The hardware mediating server of claim 1 wherein the control system is further adapted to cache data based on the application state.

15. The hardware mediating server of claim 1 wherein the control system is further adapted to:
   classify the application state as one of a plurality of predefined state classifications; and
   cache data based on the application state classification.

16. The hardware mediating server of claim 1 wherein a first communication device sends the packets to a second communication device and the control system is further adapted to provide the application state to a service.

17. The hardware mediating server of claim 16 wherein a third-party device may access the application state and communicate with the first communication device based on the application state.

18. A method executed on a processing device comprising:
   receiving packets at the processing device;
   inspecting, at the processing device, the packets to identify packets associated with a desired application based on at least one packet identification criterion;
   determining, at the processing device, a status of the desired application based on at least one of the identified packets;
   for each of a plurality of clients associated with the mediating server, determining, at the processing device, a capability of a client based on the identified packets;
   receiving, at the processing device, a query comprising a desired criterion and a desired status from a requesting network node for ones of the plurality of clients having capabilities satisfying the desired criterion and having the desired status;
   identifying, at the processing device, the ones of the plurality of clients having capabilities satisfying both the desired criterion and the desired status;
   providing, at the processing device, information identifying the ones of the plurality of clients to the requesting network node, wherein the requesting network node establishes an initial communication session with one of the plurality of clients using the provided information; and
   pre-fetching, at the processing device, data from an associated server based on anticipating a future application state of the desired application based on the application state, where the pre-fetched data is associated with the future application.

19. The method of claim 18 wherein determining the status of the desired application comprises:
   extracting information relating to the status from the at least one of the identified packets; and
   determining the status based on the extracted information.

20. The method of claim 18 wherein the at least one of the identified packets includes an application state identifier and determining the status comprises:
   providing the application state identifier to an external node in a request for the status; and
   receiving the application state identifier from the external node.

21. The method of claim 18 further comprising classifying the status as one of a plurality of predefined state classifications.

22. The method of claim 21 wherein classifying the status comprises classifying the status based on a predefined ontology for the desired application.

* * * * *